(12) United States Patent
Subelet

(10) Patent No.: US 7,103,455 B2
(45) Date of Patent: Sep. 5, 2006

(54) MAN/MACHINE INTERFACE FOR CONTROL OF THE AUTOMATIC PILOT FOR PILOTED AERODYNE PROVIDED WITH AN ATN TRANSMISSION NETWORK TERMINAL

(75) Inventor: Michel Subelet, Cugnaux (FR)

(73) Assignee: Thales, Neuilly sur Seine (FR)

( * ) Notice: Subject to any disclaimer, the term of this patent is extended or adjusted under 35 U.S.C. 154(b) by 356 days.

(21) Appl. No.: 10/489,102

(22) PCT Filed: Sep. 19, 2003

(86) PCT No.: PCT/FR03/02769

§ 371 (c)(1),
(2), (4) Date: Mar. 10, 2004

(87) PCT Pub. No.: WO2004/027732

PCT Pub. Date: Apr. 1, 2004

(65) Prior Publication Data

US 2004/0254691 A1    Dec. 16, 2004

(30) Foreign Application Priority Data

Sep. 20, 2002   (FR) .................................... 02/11683

(51) Int. Cl.
*G06F 19/00* (2006.01)

(52) U.S. Cl. .......................... 701/3; 701/11; 701/120; 342/36; 340/945; 244/175

(58) Field of Classification Search .................... 701/3, 701/11, 14, 120; 342/36; 340/945, 963, 340/971; 244/75 R, 76 R, 175
See application file for complete search history.

(56) References Cited

U.S. PATENT DOCUMENTS

| | | | |
|---|---|---|---|
| 5,025,382 A * | 6/1991 | Artz | 701/120 |
| 6,313,759 B1 | 11/2001 | Musland-Sipper | |
| 6,353,779 B1 * | 3/2002 | Simon et al. | 701/3 |
| 6,677,888 B1 * | 1/2004 | Roy | 342/36 |
| 6,828,921 B1 * | 12/2004 | Brown et al. | 340/945 |

FOREIGN PATENT DOCUMENTS

WO       02 25214 A       3/2002

OTHER PUBLICATIONS

Painter et al: "Decision Support For The General Aviation Pilot" Systems, Man, Cybernetics, 1997, Computational Cybernetics and Simulation, 1997 IEEE International Conference On Orlando Florida, USA; Oct. 12-15, 1997, New York, NY, USA, IEEE, US; Oct. 12, 1997, pp. 88-93; XP10248890.

* cited by examiner

*Primary Examiner*—Gary Chin
(74) *Attorney, Agent, or Firm*—Lowe Hauptman & Berner, LLP

(57) ABSTRACT

This MCP/FCU interface (30) for control of the automatic pilot (13) and/or flight director (14) is provided with an access port linked to the ATN terminal (2) by a digital information transmission link (4) and furnished with display device displaying the trajectory modification orders originating from the air traffic control authorities and with enabling device imposing on the automatic pilot (13) and/or flight director (14) the operating mode and the directives corresponding to a trajectory modification order having formed the subject of an acceptance by the pilot.

4 Claims, 3 Drawing Sheets

Figure 1:
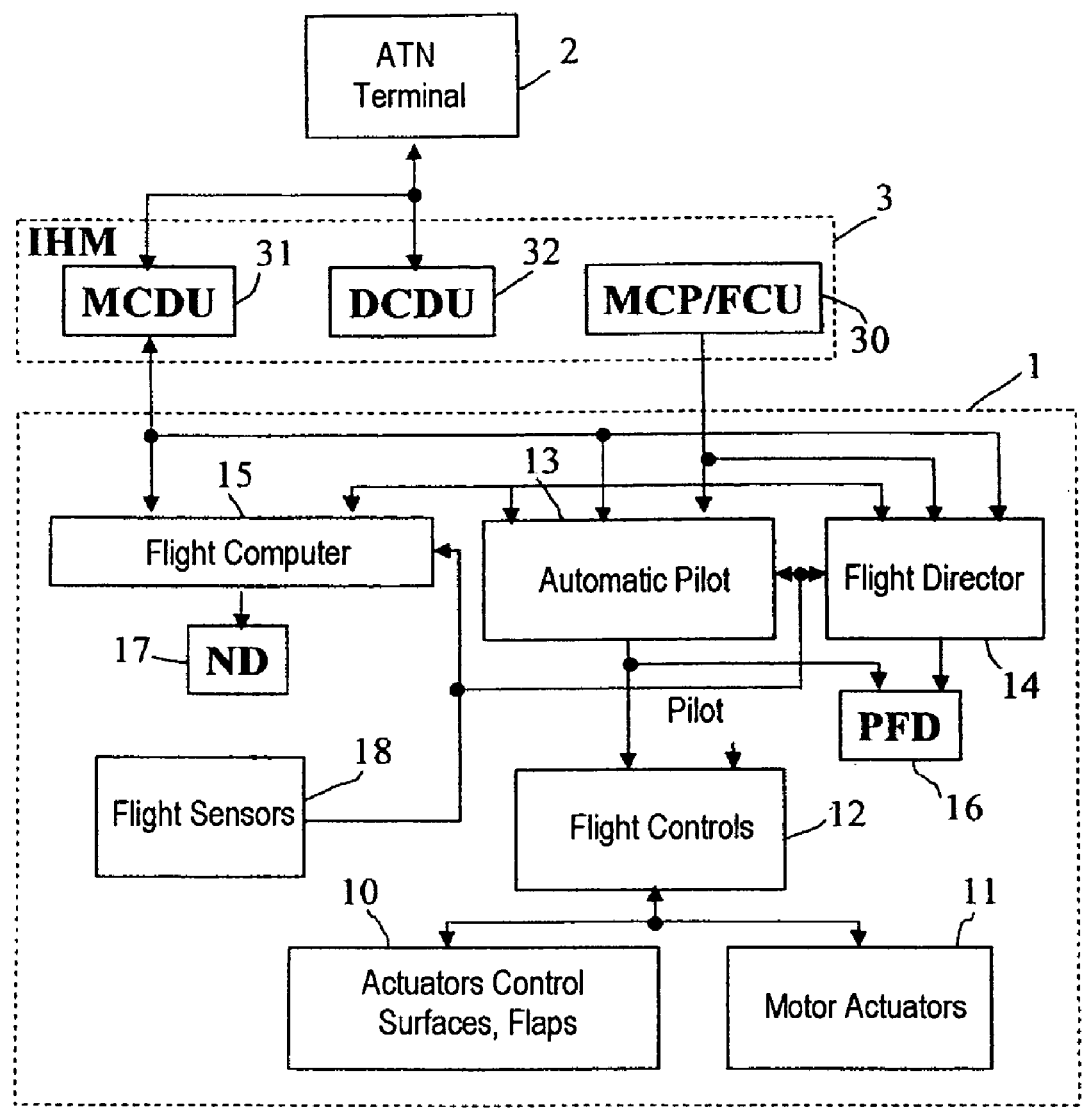

| Time | | Message List | | msglist |
|---|---|---|---|---|
| 14:13 | ✏ | Accepted: ROGER | | rqstlist |
| 14:14 | ✉ | FLY HEADING 270 | | msglog |
| 14:14 | ✏ | Accepted: WILCO | | load FM |
| acquit | accept | reject | stdby | send | clear | print |
FIG.3
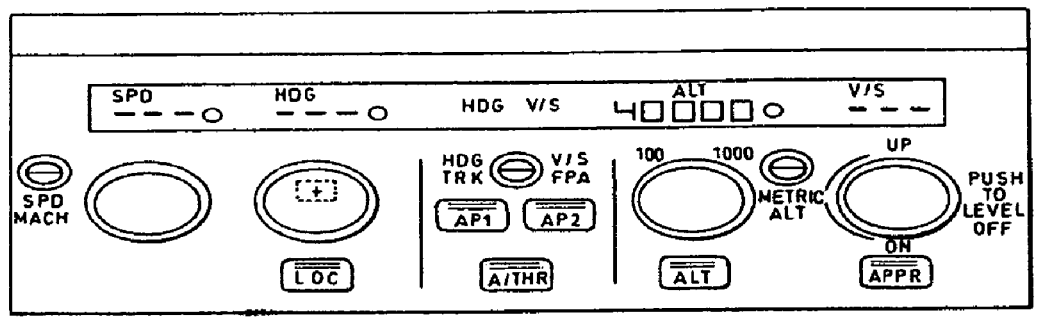
FIG.4
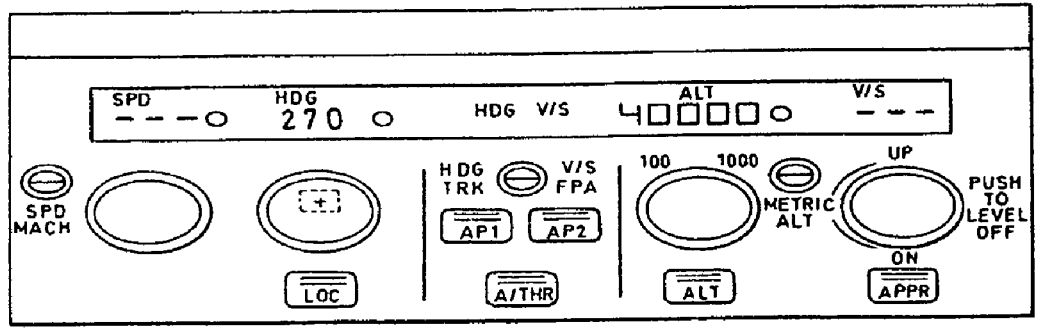
FIG.5

MAN/MACHINE INTERFACE FOR CONTROL OF THE AUTOMATIC PILOT FOR PILOTED AERODYNE PROVIDED WITH AN ATN TRANSMISSION NETWORK TERMINAL

FIELD OF THE INVENTION

The present invention relates to piloted aerodynes with automatic pilot and ATN digital transmission terminal.

DESCRIPTION OF THE RELATED ART

A piloted aerodyne comprises on board various equipment intended to allow and facilitate piloting thereof, including flight equipment acting on the moveable surfaces: control surfaces, flaps, rotors, etc., and on the motors of the aerodyne under the pilot's control, sensors of flight parameters and communication equipment allowing the crew of the aerodyne to communicate with other aircraft deploying in its vicinity and with air traffic control agencies aiding navigation.

The flight equipment is distributed into three levels as a function of its position in the actuation chain of the moving surfaces and motors of the aerodyne. The first level consists of the flight controls acting directly on the actuators of the moving surfaces and motors. They allow manual piloting. The second level consists of the automatic pilot and/or flight director which act on the flight controls, directly in the case of the automatic pilot and by way of the pilot in the case of the flight director, and which allow the pilot to slave the aerodyne to a quantity related to the trajectory of the aerodyne: attitude, heading, slope, course, altitude, speed, deviations from courses, etc. The third level consist of the flight computer which acts on the automatic pilot and/or flight director and which allows the pilot to plot a flight plan and to automatically track the flight plan adopted.

The pilot can avail himself of levers and/or pedals for acting on the flight controls and of two man/machine interfaces for acting on the automatic pilot and/or flight director and on the flight computer, one called the MCP (the acronym standing for "Module Control Panel") or FCU (the acronym standing for "Flight Control Unit") and the other called the MCDU (the acronym standing for "Multipurpose Control Unit"). The MCP/FCU interface promotes ease of use. It is reserved solely for the control of the automatic pilot and/or flight director, either by the pilot or by the flight computer. Placed, stripwise, at the base of the windscreen of the cockpit, it allows only the selection and tailoring of the main operating modes of the automatic pilot and/or flight director: maintenance of attitude, of heading, of slope, of altitude, of speed, of course or of deviation from a course. The MCDU interface promotes fineness of control. It is shared between the automatic pilot and/or flight director, the flight computer and more generally all the onboard equipment requiring tailoring, for which equipment it allows detailed control and adjustment. It takes the form of a calculator, with keypad and screen, placed, for example, on the central armrest of a cockpit having two piloting stations side by side.

The sensors of flight parameters are sensors of aerodynamic parameters: total pressure, static pressure, angle of incidence, air temperature, etc., altitude sensors such as a barometric or radioelectric altimeter and attitude or position sensors such as an inertial platform or a satellite-based navigation receiver. There are more or fewer of them depending on the degree of equipment of the aerodyne and they allow the pilot and the flight equipment to site the aerodyne with respect to its environment.

The items of communication equipment stowed on board to allow the aerodyne to exchange information with the ground or other aerodynes involve an aeronautical telecommunication network of which they constitute an onboard terminal. Aeronautical telecommunication networks that are rather more geared, originally around speech, are tending to be digitized for better reliability, exchanges of information in digital being more reliable than exchanges of phraseology by speech being independent as they are of the intonation of a speaker and of the oral comprehension of a listener. Hence, the International Civil Aviation Organization has defined and standardized a first digital aeronautical telecommunications network known by the abbreviation ACARS (standing for the expression "Arinc Communication Addressing and Reporting System") followed by a second known by the abbreviation ATN (standing for the expression "Aeronautical Telecommunication Network") designed to fulfil various categories of specific tasks or applications, one of which, referred to as CPDLC (the acronym standing for the expression "Controller-Pilot Data-Link Communication"), relates to exchanges between pilot and air traffic control authorities concerning trajectory modification orders (or "clearance"). The first ACARS aeronautical telecommunication network commissioned in the 1970s is nowadays massively used and becoming saturated. The second ATN aeronautical telecommunication network of greater capacity and better reliability is scheduled to replace the ACARS network eventually.

The communication equipment stowed on board an aerodyne can be accessed by the crew, for the exchange of digitized information, by means of a specific man/machine interface such as the so-called DCDU interface (the acronym standing for "Display Control Data Unit") and, optionally, by way of the MCDU interface.

Hitherto, the onboard communication equipment has had nothing in common with the flight equipment, with the possible exception of the MCDU interface used for adjustments and tailoring thereof. This was entirely justified when they transmitted only speech. It is less the case now that they also transmit digital information. Specifically, when this digital information originates from an air traffic control authority and corresponds to an immediate or medium-term trajectory modification request ("clearance"), it is delivered to the pilot, either on the screen of the DCDU interface, or on the screen of the MCDU interface. The pilot, who becomes aware thereof, must, if he accepts it, retranscribe it onto the MCP/FCU interface so that it is taken into account by the automatic pilot and/or flight director. This retranscription is an operation which is a source of delay in the execution of a trajectory modification. Furthermore, it is a possible source of error, all the more so because it often occurs at a crucial moment in the flight, in particular when approaching a landing field, while the pilot's attention is already monopolized by numerous other tasks.

SUMMARY OF THE INVENTION

An aim of the present invention is to simplify the pilot's task by automating this retranscription, to the automatic pilot and/or flight director, of a trajectory modification request formulated by an air traffic control authority, all this while granting the pilot leave to accept or reject this request.

It relates to a piloted aerodyne provided with a digital transmission terminal routing on board trajectory modification orders originating from an air traffic control authority, and returning the aerodyne pilot's acceptance or refusal to the air traffic control authority, with an automatic pilot and/or flight director having operating modes for tracking directives for attitude, heading, ground speed, vertical speed and altitude, and with a man/machine interface for control of the automatic pilot and/or flight director making it possible to choose an operating mode of the automatic pilot and/or flight director from among the possible modes and to tailor the mode chosen. Its subject is a man/machine interface of the aforesaid type, provided with an access port which is linked to the transmission terminal and on which it receives, from the digital transmission terminal, the trajectory modification orders emanating from an air traffic control authority, with display means displaying the trajectory modification orders received by way of the digital transmission terminal, in a manner distinct from the directives currently being executed by the automatic pilot and/or flight director and enabling means imposing on the automatic pilot and/or flight director the operating mode and the directives corresponding to a trajectory modification order originating from an air traffic control authority, received by the digital transmission terminal and having formed the subject of an acceptance on the part of the pilot.

Advantageously, the display means of the man/machine interface for control of the automatic pilot and/or flight director alternately display, in various ways, a directive of an operating mode currently being executed and a directive corresponding to a trajectory modification order emanating from an air traffic control authority and on standby pending acceptance or refusal by the pilot.

Advantageously, the man/machine interface is provided with means for detecting incompatibilities existing between on the one hand the operating mode that it imposes on the automatic pilot and/or flight director and on the other hand a trajectory modification order originating from an air traffic control authority and applied to its access port, and alarm means triggered by the means for detecting incompatibility.

Figure 2:
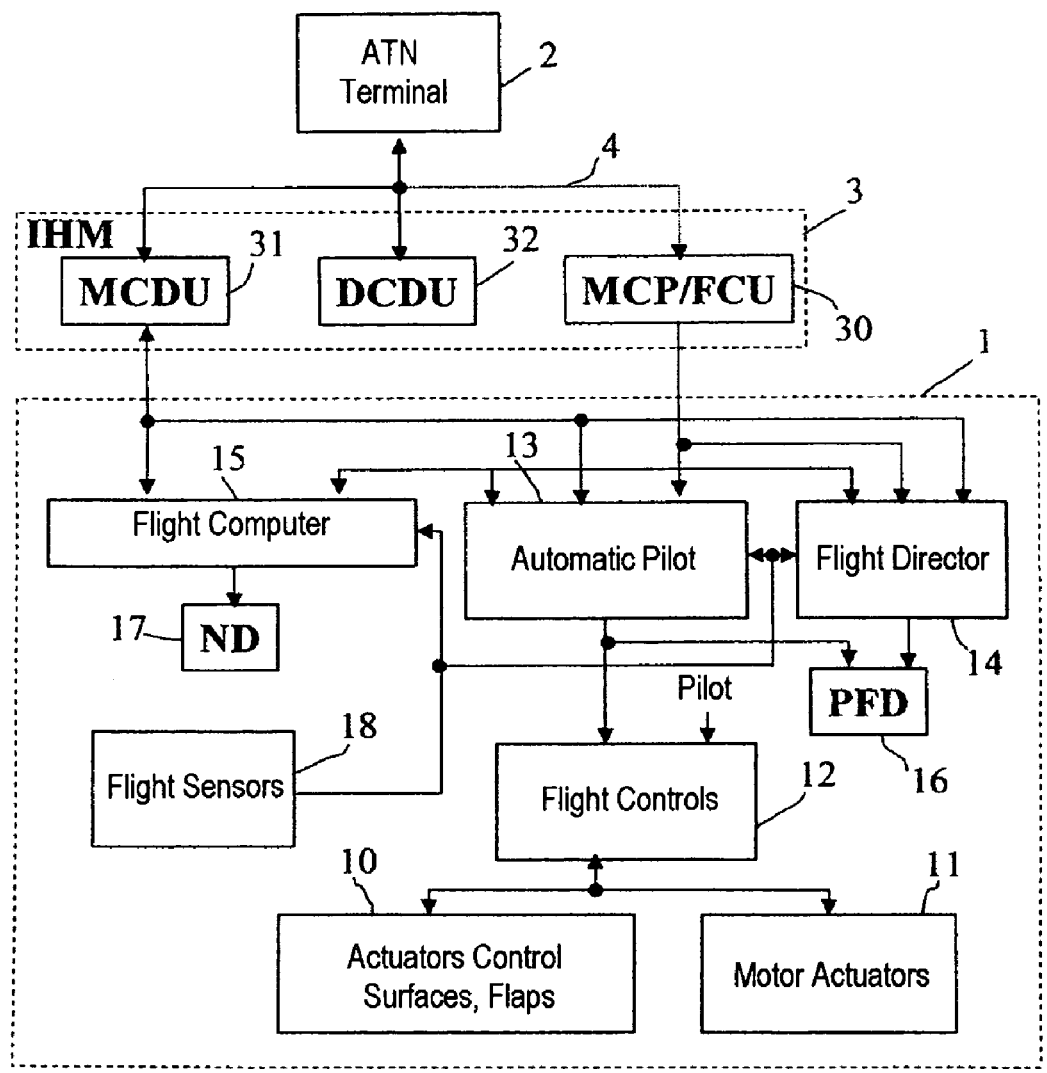

Other advantages and characteristics of the invention will emerge from the description hereinbelow of an embodiment given by way of example. This description will be offered in conjunction with the drawing in which:

BRIEF DESCRIPTION OF THE DRAWINGS a FIG. 1 is a block diagram illustrating the customary arrangement, in total independence, of the piloting equipment and of the transmission equipment on board an aerodyne, a FIG. 2 repeats the block diagram of FIG. 1, supplemented with a link according to the invention implementing the transmission equipment in conjunction with the piloting equipment so as to allow them to retranscribe "clearances" under the pilot's control, a FIG. 3 illustrates the screen of a display dedicated to the CPDLC applications of an ATN transmission network, and FIGS. 4 and 5 illustrate the change of display of an MCP/FCU interface for control of automatic pilot and/or flight director, before and after the acceptance of a "clearance" by the pilot.

DETAILED DESCRIPTION OF THE EMBODIMENT

FIG. 1 gives an example of an arrangement of equipment that may currently be found on board an aerodyne with a view to allowing and facilitating piloting thereof. Depicted therein is a first group 1 of equipment referred to as the flight equipment since it acts directly or indirectly on the positionings of the control surfaces, flaps, etc., and on the settings of the motors of the aerodyne, a second group of telecommunication equipment 2 and a third group 3 of man/machine interfaces allowing the pilot to control and tailor the equipment placed at his disposal.

An aerodyne is piloted by way of steerable surfaces: control surfaces, flaps, rotor blades, etc., and the output of the or of its propulsion motors. For this purpose, it comprises a first level of flight equipment allowing manual piloting. This first level of flight equipment consists of actuators 10, 11 of its steerable surfaces and of its propulsion motors receiving position and adjustment directives calculated by equipment 12 referred to as "flight controls", copying over the positions of the levers, pedals and joysticks serving for the manual piloting of the aerodyne. This first level of flight equipment is often supplemented with an automatic pilot 13 and/or flight director 14 constituting a second level of equipment and with a flight computer 15 constituting a third level of equipment.

The automatic pilot 13 and/or flight director 14 greatly facilitate the pilot's task by automating the tracking of directives of attitude, of heading, of slope, of course, of altitude, of ground speed, of vertical speed, of deviations from courses, the one the automatic pilot 13 by a direct action on the flight controls 12 and the other, the flight director 14, by suggesting to the pilot, by way of PFD display screens 16 (the acronym standing for "Primary Flight Display"), the actions to be performed on the flight controls 12. In practice they constitute one and the same item of equipment since they fulfil the same tasks, the only difference being the presence or otherwise of the pilot in the actuation chain for the flight control equipment 12. They are accessible to the pilot via two man/machine interfaces, an MCP/FCU interface 30 and an MCDU interface 31. The MCP/FCU interface 30 promotes ease of use. It is placed, generally stripwise, at the base of the windscreen of the cockpit of the aerodyne and allows only the selection of an operating mode of the automatic pilot 13 and of the flight director 14 out of their various possible operating modes: maintenance of attitude, of bearing, of slope, of course, of altitude of ground speed, of deviations from courses, and the tailoring of the selected mode. The MCDU interface 31 promotes fineness of control. It takes the form of a calculator, with screen and keypad, arranged on the central armrest of a cockpit having two piloting stations side by side. It allows control and thorough tailoring of the automatic pilot 13 and of the flight director 14.

The flight computer 15 automates the tasks of piloting and of tracking the flight plan of the aerodyne. It intervenes on the piloting of the aerodyne at the level of the automatic pilot 13 and/or flight director 14 to which it provides directives by way of the MCP/FCU man/machine interface 30. It is accessible to the pilot via the MCDU interface 30 and via an ND display screen 17 (the acronym standing for "Navigation Display"). The flight equipment group 1 also comprises sensors called flight sensors 18 since they allow the pilot and the flight equipment, automatic pilot 13 and/or flight director 14, flight computer 15, to site the aerodyne with respect to its environment. The flight sensors are sensors of aerodynamic parameters: total pressure, static pressure, angle of incidence, air temperature, etc., altitude sensors such as a barometric or radioelectric altimeter and attitude or position sensors such as an inertial platform or a satellite-based navigation receiver. There are more or fewer of them depending on the degree of equipment of the aerodyne.

The telecommunication equipment group 2 consists of an ATN terminal accessible to the pilot, for the exchange of digitized information, by means of a DCDU interface 32 or of an MCDU interface 31 depending on the aerodyne.

The ATN network is a digital transmission network more particularly dedicated to exchanges of information between aerodynes and the ground in respect of activities both of air traffic control ATC and of exchanges of information with airlines chartering the aerodynes and referred to as AOCs (the acronym standing for "Aeronautical Operational Communication"). The ATC activities of the ATN network include various categories of specific tasks or applications, including the category of CPDLC applications relating to the transmission and to the processing of "clearances" or trajectory modification orders issued by the air traffic control authorities.

As shown in FIG. 3, these "clearances" received by the ATN terminal 2 are displayed together with their times of receipt, for the benefit of the pilot, on the screen of his DCDU 32 or MCDU 31 man/machine interface. The pilot, who can also receive speech confirmations of these "clearances", has several possible appropriate responses, accessible via keys appearing at the base of the touch screen of the DCDU 32 or MCDU 31 man/machine interface: acknowledge, accept, refuse, standby, etc. When he has given his agreement by pressing the acceptance key and confirmed this agreement by pressing the send key, it remains for him to enter the requested trajectory modification into the automatic pilot 13 and/or flight director 14, this involving on his part a retranscription of the new trajectory parameter or parameters onto the MCP/MCU man/machine interface 30 of the automatic pilot 13 and/or flight director 14 and, optionally, a change of operating mode of the automatic pilot 13 and/or flight director 14.

The situation illustrated in FIGS. 3 and 4 is that of a trajectory modification order involving tracking along a new heading at 270 while the MCD/FCU interface 30 shows that the automatic pilot 13 and/or flight director 14 were programmed only to maintain altitude at a level of 40 000 feet. The pilot, after accepting the new heading requested by the air traffic control authority, must retranscribe this new heading onto the MCP/FCU interface 30 and activate a new operating mode of the automatic pilot 13 and/or flight director 14 ensuring both maintenance of the altitude at a level of 40 000 feet and selection and maintenance of the new heading at 270, this having to be conveyed, ultimately, by the new display, shown in FIG. 5, of the MCP/FCU interface 30.

It is proposed that the pilot's task be simplified during the processing of a trajectory modification order originating from the air traffic control. To do this, an information transmission link 4 is added, as represented in FIG. 3, routing the trajectory modification orders received by the ATN terminal 2 to the MCP/FCU man/machine interface 30 of the automatic pilot 13 and/or flight director 14, and the MCP/FCU man/machine interface 30 of the automatic pilot 13 and/or flight director 14 is furnished with a function of automatic retranscription of the trajectory modification orders received by the information transmission link 4 and with a function of activation, after actuation by the pilot of a confirmation button, of the operating mode of the automatic pilot 13 and/or flight director 14 corresponding to a trajectory modification order confirmed by the pilot.

The addition of the digital transmission link 4 involves the presence, on the MCP/FCU man/machine interface 30 of the automatic pilot 13 and/or flight director 14, of an access port compatible with the ATN terminal 2 which may be embodied either as hardware or as software when the information exchanges between onboard equipment travel via an airplane bus. The new functions of retranscription and actuation of the trajectory modification orders originating from an air traffic control authority are embodied as software, the MCP/FCU interface calling upon one or more microprocessors.

With an MCP/FCU man/machine interface 30 thus modified, that is to say capable of receiving directives not only from the flight computer 15 but also from the ATN terminal 2, the step of FIG. 4 disappears. The directive or directives corresponding to a trajectory modification order originating from an air traffic control authority is or are directly apparent to the pilot on the display of this interface, with a different appearance from a directive currently being applied by the automatic pilot 13 and/or the flight director 14, for example according to a flashing mode of display while the directives currently being applied are displayed continuously or with different display colours. For the trajectory modification order emanating from an air traffic control authority to be taken into account by the automatic pilot 13 and/or flight director 14, it is merely necessary to press a confirmation button.

In addition to these new functions, the MCP/FCU man/machine interface may also be furnished with a function of monitoring correct execution of the trajectory modification orders received from an air traffic control authority, generating visual and/or audible alerts to warn the pilot of an incompatibility between the guidance of the aircraft and the orders received from the air traffic control authority.

The invention claimed is:

1. A man/machine interface for piloted aerodyne provided with a digital transmission terminal routing on board trajectory modification orders originating from an air traffic control authority, and returning the aerodyne pilot's acceptance or refusal to the air traffic control authority, with an automatic pilot and/or flight director having operating modes for tracking directives for attitude, heading, ground speed, vertical speed and altitude, the said man/machine interface making it possible to choose an operating mode of the automatic pilot and/or flight director from among the possible modes and to tailor the mode chosen, the man/machine interface comprising:

an access port which is linked to the digital transmission terminal and on which the trajectory modification orders emanating from the air traffic control authority is received from the digital transmission terminal;

display means displaying the trajectory modification orders received by way of the digital transmission terminal, in a manner distinct from the directives currently being executed by the automatic pilot and/or flight director; and enabling means imposing on the automatic pilot and/or flight director the operating mode and the directives corresponding to a trajectory modification order originating from an air traffic control authority and having formed the subject of an acceptance on the part of the pilot.

2. The interface according to claim 1, wherein the display means alternately display, in various ways, a directive of an operating mode currently being executed by the automatic pilot and/or the flight director and a directive corresponding to a trajectory modification order emanating from an air traffic control authority and on standby pending acceptance or refusal by the pilot.

3. The interface according to claim 1, wherein the display means display under different colours a directive of an operating mode currently being executed by the automatic pilot and/or the flight director and a directive corresponding to a trajectory modification order emanating from an air traffic control authority and on standby pending acceptance or refusal by the pilot.

4. The interface according to claim 1, further comprising means for detecting incompatibilities existing between on the one hand the operating mode that it imposes on the automatic pilot and/or flight director and on the other hand a trajectory modification order originating from an air traffic control authority and applied to the access port, and alarm means triggered by the means for detecting incompatibility.

* * * * *